United States Patent
Knowles et al.

(10) Patent No.: US 6,665,868 B1
(45) Date of Patent: Dec. 16, 2003

(54) OPTIMIZING HOST APPLICATION PRESENTATION SPACE RECOGNITION EVENTS THROUGH MATCHING PRIORITIZATION

(75) Inventors: Gregory Thomas Knowles, Raleigh, NC (US); Bradley Thomas Marchesseault, Cary, NC (US); James Merwin Mathewson, II, Chapel Hill, NC (US); Brian Thomas Webb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,239

(22) Filed: Mar. 21, 2000

(51) Int. Cl.[7] .............................................. G06F 9/445
(52) U.S. Cl. ...................................... 717/178; 709/103
(58) Field of Search ................................ 345/631–639, 345/807, 963–970; 717/172–178; 709/103–105, 207, 231–232, 313–319, 328–332

(56) References Cited

U.S. PATENT DOCUMENTS

| | | | | |
|---|---|---|---|---|
| 4,642,790 A | * | 2/1987 | Minshull et al. ............. | 345/784 |
| 5,163,046 A | * | 11/1992 | Hahne et al. ................ | 370/237 |
| 5,228,137 A | * | 7/1993 | Kleinerman et al. ......... | 703/26 |
| 5,596,695 A | * | 1/1997 | Hamada et al. .............. | 345/763 |
| 5,784,578 A | * | 7/1998 | Galloway et al. ........... | 710/105 |
| 5,797,043 A | * | 8/1998 | Lewis et al. .................. | 710/56 |
| 5,961,592 A | * | 10/1999 | Hsia ........................... | 709/217 |
| 6,182,276 B1 | * | 1/2001 | Brawn et al. ................ | 717/109 |
| 6,259,447 B1 | * | 7/2001 | Kanetake et al. ........... | 345/764 |
| 6,259,699 B1 | * | 7/2001 | Opalka et al. .............. | 370/398 |

* cited by examiner

Primary Examiner—Kakali Chaki
Assistant Examiner—Tuan A Vu
(74) Attorney, Agent, or Firm—Jeanine S. Ray-Yarletts; Marcia L. Doubet (57) ABSTRACT

A method, system, and computer program product for optimizing recognition of presentation space data. Presentation space data is sent from a legacy host application to a workstation. A workstation application monitors arrival of multiple predetermined presentation space definitions, and invokes an appropriate target object to process each recognized presentation space of interest. Prioritization techniques are used to optimize the recognition process, whereby higher priority definitions are processed first. A time of day heuristic is defined, which influences priority of presentation space recognition according to the time of day in which specific presentation space data typically arrives at the user's workstation. Priority pools may be used to provide a desired granularity of priority. Priority may be learned dynamically by the implementation, and may be initialized explicitly (or defaulted). Priority of a definition may be demoted if an inactivity timer expires. Priority information may be persisted to a data store.

28 Claims, 7 Drawing Sheets

```
                                  605              615
<DESCRIPTION NAME="SCREEN-1" PRIORITY="5">
620    <CURSOR ROW="1" COLUMN="4" />
625    <STRING "Employee Data" />
630    <TARGET METHOD=" ... " />
640    <LAST-ARRIVAL TIME="01/01/2000 12:34:56" />
</DESCRIPTION>
```

610

600

OPTIMIZING HOST APPLICATION PRESENTATION SPACE RECOGNITION EVENTS THROUGH MATCHING PRIORITIZATION

BACKGROUND OF THE INVENTION

1. Field of the Invention

The present invention relates to a computer system, and deals more particularly with a method, apparatus, and computer program product for optimizing recognition of data being sent to a workstation from a legacy host application.

2. Description of the Related Art

One of the challenges facing information services ("IS") professionals today is the difficulty of bridging legacy mainframe host data to modem user interfaces. Most legacy host applications present their data in text-based user interfaces designed for use on specific, obsolete character-based terminals. The legacy applications were written with this character-based terminal presentation space as the only interface format in which the host data output is created, and in which host data input is expected. "Presentation space" is a term used abstractly to refer to the collection of information that together comprises the information to be displayed on a user interface screen, as well as the control data that conveys how and where that information is to be represented. This collection of information is stored in an area of computer storage and/or memory.

A typical character-based terminal is the IBM Model 327x. (IBM is a registered trademark of the International Business Machines Corporation.) This terminal model was designed to display information in a matrix of characters, where the matrix typically consisted of 24 rows each having 80 columns. When programs were written expecting this display format, programmers would specify placement of information on the screen using specific row and column locations. Information formatted for this display is sent as a "data stream" to the mechanism in the display hardware that is responsible for actually displaying the screen contents. The phrase "data stream" refers to the fact that the data is sent as a linear string, or stream, of characters. This stream of characters contains both the actual textual information to be displayed on the screen, as well as information specifying where and how the text is to be displayed. "Where" consists of the row and column where the text is to begin, and "how" consists of a limited number of presentation attributes such as what color (typically either green or white) to use when displaying that text. While the Model 327x is a specific type of IBM display hardware, data formatted for any display having similar characteristics became a de facto standard format referred to as a "3270 data stream". Similarly, the IBM Model 525x is another type of character-based terminal. This terminal displays data in a slightly different manner from the IBM 327x, and consequently uses a different data stream format. The "5250 data stream" also became a de facto standard format for displays having similar characteristics. A third type of data stream format commonly used by legacy host applications is referred to simply as an "ASCII data stream". While an ASCII data stream is not formatted for a specific model of display screen, a data stream in this format has certain predefined characteristics (for example, the manner in which a control character indicates the line spacing to be used).

The displays used with modern computer workstations (including personal computers, network computers, and other types of computers) support graphics and video, in addition to text characters. These displays do not use a character-based row and column matrix approach to screen layout. Instead, the programmer has access to thousands of tiny display elements, allowing the various types of information to be placed virtually anywhere on the display screen.

When the modem computer workstation is used to access a legacy host application running on a mainframe, the output data created by that host application is often still formatted as one of the character-based data streams. The workstation may have access to the host application and the presentation space it uses through mainframe emulator software. An example of mainframe emulator software is the Personal Communications product from IBM. Emulator software runs on the workstation. This software provides facilities to establish a telecommunications connection between the workstation and the host computer, to invoke execution of a software application stored on that host, and to transfer information between the host and the workstation as the application runs. When a legacy application is accessed using an emulator, it appears to the host as if the host was interacting with a so-called "dumb terminal" (such as a Model 3278), instead of an intelligent workstation. The emulator takes care of reformatting the character-based data sent by the legacy application (using the presentation space for transferring data), for display on a modem display screen.

The computer information industry has begun moving away from using mainframe emulators as the primary user interface to the host applications. When an emulator is no longer used, either the legacy host application must be rewritten so that it creates output in a format recognized by modem displays or the emulator's complicated interface logic for translating between the character-based data stream and the modem workstation display screen layout must be performed by some other service running on the workstation. Rewriting the legacy applications is typically not a viable approach, and thus many IS professionals have chosen an alternative solution. In this alternative solution, the user interface facility of a modern application program accepts the existing host presentation space format when retrieving data from the host application, but does not show the data to the user in this format. The new user interface facility "scrapes" (that is, extracts) data from the host presentation space, and presents it to the user in a form that is appropriate for the display screen device used with the computer system. By convention, this form tends to be a graphical user interface where information is presented in a window-based layout. The user interacts with the application using this graphical user interface. When data needs to be returned to the application computer, for example in response to the user's input, the user interface facility converts this information automatically into a format that is recognized by the host application.

While a screen scraping approach avoids rewriting the legacy host application, it presents a new problem. Presentation spaces appear asynchronously in the data stream sent from the host application, so using the presentation space format as the expected format for user interface data becomes unpredictable. Whether it is due to network traffic, host application response time, etc., there is no set time when a presentation space will begin arriving from the host application, and no specific period of time in which the entire screen contents will be transmitted. U.S. Pat. No. 6,182,276, which is titled "Host Application Presentation Space Recognition Producing Asynchronous Events", defines a technique for automating host presentation space interaction. This patent is referred to hereinafter as the related invention, and is incorporated herein by reference. According to this related invention, one or more presentation space definitions may be created, where each definition specifies information that will be present in a particular presentation space that may arrive from the legacy application. For each defined presentation space, a target software routine may be identified which embodies knowledge of how the presentation space is formatted and how the information contained in that presentation space is to be presented to the user. The data stream coming from the host is constantly monitored to see if one of the defined presentation spaces appears. When a defined presentation space does appear, the associated target software routine is asynchronously invoked for processing the data contained in that presentation space.

While the related invention defines a useful advancement in the art, it may suffer from inefficient system performance if the number of presentation space definitions is very large. For those companies which have been using legacy host applications extensively for many years, there may be hundreds or even thousands of screens which are sent by legacy applications to user workstation software. When the presentation space definitions according to the related invention take on this order of magnitude, performing a sequential comparison of an incoming data stream to each defined presentation space may expend a considerable amount of processing time for comparisons which ultimately fail. This may significantly increase processing time, and may be an inefficient use of computing resources.

Accordingly, what is needed is an improved technique for recognizing asynchronously-appearing presentation spaces (and initiating processing thereof) in data streams generated by legacy host applications.

SUMMARY OF THE INVENTION

An object of the present invention is to provide a technique for optimizing recognition of presentation space data generated by a legacy host application.

Another object of the present invention is to provide this technique by prioritizing the matching process which is used.

A further object of the present invention is to use prioritization pools for optimizing the matching process.

Yet another object of the present invention to use a time of day heuristic for influencing prioritization in the matching process.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for optimizing recognition of presentation space data generated by a legacy host application. This technique comprises: organizing a plurality of presentation space definitions into a plurality of pools; monitoring at least one data stream for arrival of presentation space data; comparing an arrived presentation space to the plurality of presentation space definitions in the plurality of pools, this comparison using a prioritized order of the pools; and notifying a target software routine to process the arrived presentation space upon detecting a match by the comparison.

In one embodiment, each of the pools corresponds to a particular time of day period. The comparison then further comprises: determining a current time of day; determining a selected pool corresponding to the determined current time of day; and using the selected pool as a highest priority in the prioritized order. This embodiment may further comprise: using a different pool as a next highest priority in the prioritized order; and adding a matched presentation space definition to this different pool upon detecting the match using this different pool. In addition, this embodiment may further comprise persisting the plurality of pools to persistent storage, thereby reflecting operation of the organizing and the adding.

In another embodiment, each of the pools corresponds to a priority attribute value. The comparison then further comprises: determining a current highest priority attribute value; determining a selected pool corresponding to this current highest priority attribute value; using the selected pool as a highest priority in the prioritized order; and iteratively comparing if the match is not detected. The iterative comparison further comprises: determining a next highest priority attribute value; determining the selected pool corresponding to this next highest priority attribute value; and repeating the use of the selected pool as the highest priority and the iteratively comparing until the match is detected or until no more presentation space definitions remain for use by the comparison. This embodiment may further comprise promoting a matched presentation space definition to a higher priority pool upon detecting the match in a pool which is not a highest priority pool. The plurality of pools may be persisted to persistent storage, thereby reflecting the organizing and this optional promoting. This embodiment may also further comprise selectively demoting presentation space definitions. This selective demotion further comprises: defining an inactivity timer; remembering a timestamp when each of the plurality of presentation space definitions was last matched during operation of the comparison; comparing each of the remembered time stamps to the inactivity timer; and moving each of the presentation space definitions for which the comparing of the remembered timestamp determines that the inactivity timer has expired, wherein the definition is moved from a first pool to a second pool having a next lower priority than the first pool. In this case, an optional persisting of the plurality of pools to persistent storage thereby reflects operation of the organizing, the promoting, and the selective demoting.

The present invention will now be described with reference to the following drawings, in which like reference numbers denote the same element throughout.

DESCRIPTION OF THE PREFERRED EMBODIMENT

Figure 1:
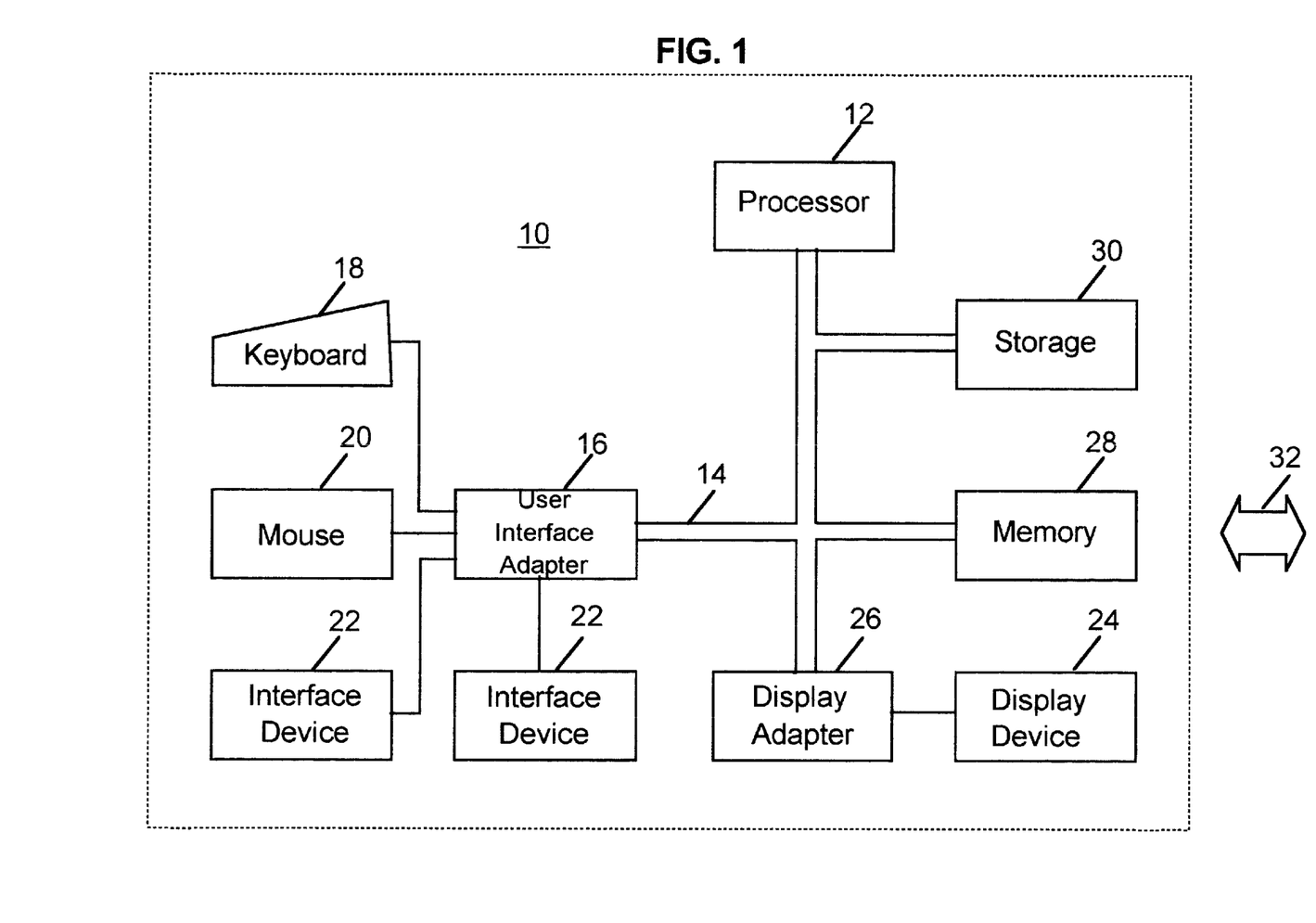
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art.

Figure 2:
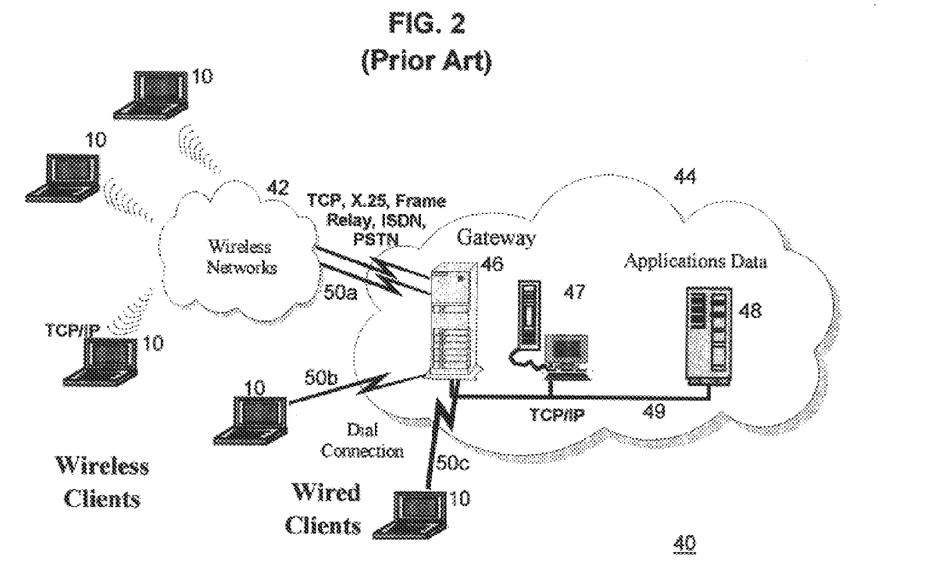
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 (or server 47 or gateway 46) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The computing environment in which the present invention may be used includes an Internet environment, an intranet environment, an extranet environment, or any other type of networking environment. These environments may be structured using a client-server architecture, a multi-tiered architecture, or an alternative network architecture.

The preferred embodiment of the present invention will now be discussed with reference to FIGS. 3 through 6.

In the preferred embodiment, the present invention is implemented as a computer software program. The implementation of the invention may be used with any software application that receives data from a legacy host application using a presentation space model, and which monitors the received data for arrival of multiple predetermined presentation space definitions. The application may execute entirely on the user's computer or it may execute on a remote computer, such as a middle-tier server or gateway. Alternatively, the application may execute partly on the user's computer and partly on the remote computer. In the preferred embodiment, the invention will be implemented using object-oriented programming languages and techniques. However, the invention may alternatively be implemented using conventional programming languages that are not object-oriented, without deviating from the inventive concepts. Use of the term "object" herein is not to be construed as limiting the invention to object-oriented techniques.

The preferred embodiment is described using references to a 3270 data stream. However, the inventive concepts of the present invention are not limited to 3270 data stream formats: any data stream format may be equivalently used, where the data stream format is well-defined and has well-defined codes indicating the attribute types used in the data stream.

The related invention allows the programmer to register presentation space definitions (that is, definitions of user interface screens or portions thereof) for monitoring by a screen recognition object, to specify which data stream(s) should be monitored for the presence of the registered presentation spaces, and to specify the target software routine which is to receive an asynchronous notification when a particular registered presentation space appears in the data stream. An embodiment of the related invention then monitors the data streams(s), and generates an asynchronous notification to the appropriate target software routine when a registered presentation space is detected. The target object contains the logic to process the presentation space: it understands the data stream format used, and knows what to do with the elements it contains. For example, the target object will typically scrape the data from the presentation space, and reformat it for display. Further, the related invention includes features by which the programmer can indicate that monitoring for a specific presentation space should cease.

The present invention provides an improved technique for recognizing asynchronously-appearing presentation spaces in a data stream generated by a legacy host application. Thus, the processing of the detected presentation space by its associated target software routine can be invoked more quickly, leading to faster processing time and improved overall system performance. According to the present invention, the presentation space definitions are prioritized, and an arriving presentation space is compared to the definitions using this prioritization.

In a first aspect of the present invention, a time of day heuristic is used to increase efficiency of the matching process. Because the functions performed by human users often follow particular time patterns, an implementation of the present invention may observe a user's behavior and dynamically learn which presentation spaces typically arrive during which time periods for this user. For example, a user may interact with a legacy host application to check his or her electronic mail upon first arriving at work each day, and may use this same host application to check for mail again when returning from lunch and before leaving work each day. The presentation spaces used with the mail application therefore arrive with some regularity during these time periods, but may not be detected during other time periods. According to this aspect, as time passes throughout the day, different priority pools (and their presentation spaces) become higher priority. By treating these presentation spaces as having higher priority during the pertinent time periods, and as low priority during other time periods, the efficiency of the matching process increases. The granularity of the time periods (e.g. whether an hour long, or several hours long, or some shorter duration) which leads to optimal performance for a particular user will vary depending on the user's application usage patterns, and thus the duration may be configured differently from one embodiment of the present invention to another. Preferably, the duration to be used for each time period is configured through a user interface prior to operation of the present invention, whereby a person such as a systems administrator or individual user selects the time period granularity. Alternatively, the duration may be specified by coding a time period granularity directly into the application program which implements the screen recognition process of the present invention.

Figure 3:
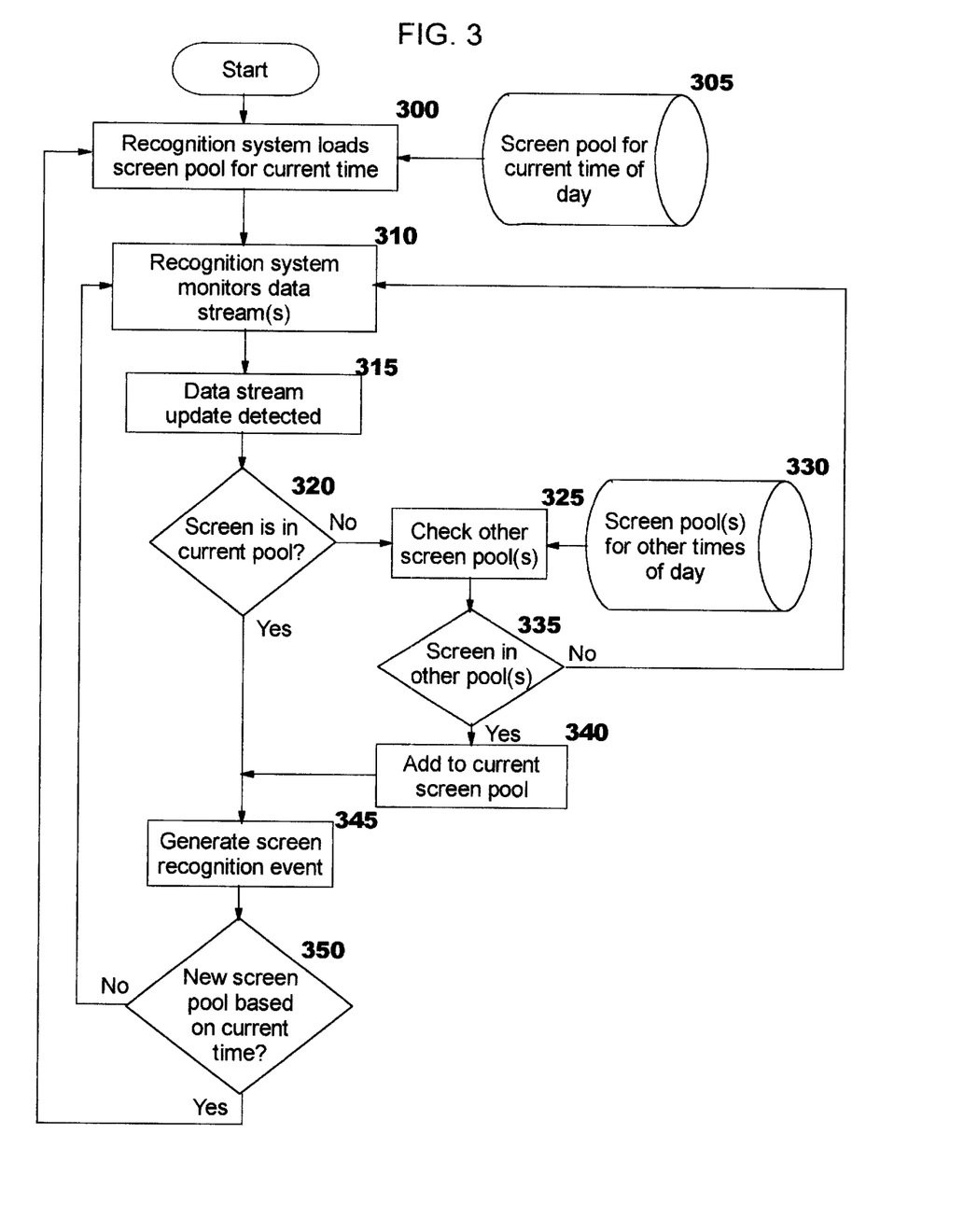
FIGS. 3–5 illustrate flow charts setting forth the logic which may be used to implement aspects of a preferred embodiment of the present invention.

FIG. 3 depicts the logic which may be used to implement the time of day heuristic of this first aspect of the present invention. The screen recognition process begins at Block 300, where the recognition system determines which screen pool corresponds to the current time of day for the workstation on which it is executing. That pool of presentation space definitions is then loaded or otherwise made accessible from its location in memory or other storage 305. Monitoring of the appropriate data stream or streams (Block 310) occurs, awaiting arrival of a presentation space. Upon detecting an update to the data stream (Block 315), a matching process is then invoked to determine whether this is a screen for which a presentation space has been defined. (The related invention describes the functioning of Blocks 310 and 315,as well as Block 345 which is discussed below, in detail with reference to FIGS. 4 and 5 contained therein.)

If the presentation space which has arrived in a monitored data stream matches a definition which is a member of the pool corresponding to the current time of day, then Block 320 has a positive result and control transfers to Block 345. Otherwise, processing continues at Block 325 which obtains screen pools for other times of day from memory or storage 330 (which may be co-located with memory or storage 305). In a preferred embodiment, the next sequential time period and previous time period are checked first, to account for slight changes in the user's behavioral patterns. If the definition is not located in either of these pools, then an in-order traversal through each remaining time period is preferably performed. (Alternatively, a different traversal order may be used without deviating from the inventive concepts of the present invention.) If the arriving presentation space is not a member of any pool, then Block 335 has a negative result and control returns to Block 310 as there is no registered target software routine for processing this presentation space. Otherwise, when the presentation space is a member of some pool, control transfers to Block 340.

Block 340 adds the presentation space definition which matched the arriving data to the pool for the current time of day period, based on the time of day at the user's workstation. In the preferred embodiment, this comprises copying an identification of the presentation space definition into a list maintained by the current time of day pool. Thus, one presentation space definition may be a member of more than one pool. As Block 340 executes repeatedly over time, the present invention dynamically learns in which time period(s) a particular presentation space is most likely to arrive, thereby optimizing performance of the recognition process.

Block 345 is reached when the arriving presentation space matched a definition which is now in the current pool. At Block 345, a screen recognition event is generated, which comprises generating an asynchronous notification to the registered target software routine. (The target software routine processes the data in the presentation space using techniques which are application-specific and which do not form part of the present invention.) Block 350 then checks to see if the time of day has changed such that a different pool should have highest priority. If so, then control returns to Block 300 to obtain the new pool; otherwise, control returns to Block 310 to continue monitoring the data stream (s) using the previously-determined pool.

A priority granularity attribute is defined for use in a second aspect of the present invention, whereby each presentation space definition is a member of one of a number of priority pools. Priority granularity refers to the number of such priority pools currently in use. The number of pools may be initially set explicitly (e.g. by a configurable parameter or by coding a value directly into the software), or it may be determined dynamically. During execution, the priority granularity may be expanded or contracted dynamically.

A default priority value is preferably assigned to a priority attribute associated with each presentation space definition. (Refer to the related invention for a description of creating presentation space definitions. A priority attribute may be added to each definition using the process described with reference to FIG. 3 therein.) Alternatively, priority values may be initialized to a particular default value when the embodiment of the present invention begins operation. In this latter case, each definition may use a common default value, or a default may be determined algorithmically using application-specific criteria. The priority attribute value indicates the pool of which the presentation space definition is initially a member. For example, when explicitly setting priority values, a value of 1 may be used to cause a particular presentation space definition to be initially included in the highest priority pool, whereas a priority value of 5 may be used to initially put a definition into a lower priority pool. (Definitions may then dynamically move from one pool to another to reflect the presentation space arrival characteristics learned by the present invention, as will be described with reference to FIGS. 4 and 5.)

As will be obvious, it may take some time after system start-up for efficiency gains to be realized from dynamically learning presentation space arrival characteristics, depending on (inter alia) the number of definitions, the amount of detail in each definition, the arrival patterns for a particular legacy host application, the usage patterns of a particular user, the relative frequency among the defined presentation spaces, etc. By setting priority attribute values on presentation space definitions as the definitions are created, according to expected arrival characteristics of a particular environment, performance of the prioritized recognition process according to this second aspect yields immediate efficiency benefits as the system begins operation and does not exhibit the delayed efficiency improvement that may occur otherwise.

The dynamic determination of pool granularity comprises evaluating the priority attribute values over the set of defined presentation spaces. Once this has been done, the number of pools may be determined algorithmically. In a simple case, the number of pools may be set to the highest attribute value. For example, if attribute values 1, 3, 5, and 10 have been defined, then 10 pools will be used in this approach (even though some are initially empty). As another example, the highest attribute value may be divided by some number. Using the same values 1, 3, 5, and 10, assume the divisor is 2. In this case, 5 pools will be used (each containing definitions for 2 different priority attribute values). As yet another example, the number of distinct attribute values (4, in the example) may dictate the number of pools. The proper number of pools to be used impacts the efficiency of the comparison process. For example, if only two levels of priority are defined (i.e. two pools are used) in a system which contains hundreds or thousands of definitions, the system is unlikely to perform optimally. If ten levels (and thus ten pools) are defined for a system which has one hundred definitions, on the other hand, then this system may indeed perform well. Increasing the number of pools will typically yield performance improvements until a system-dependent point of diminishing return.

As with the time of day pools described in the first aspect, when the priority pools of this second aspect are used, it is not necessary to strictly order each presentation space definition for the matching process according to the number of times it has been detected, but rather the presentation space definitions which are members of a particular pool may be compared in any order.

Figure 4A:
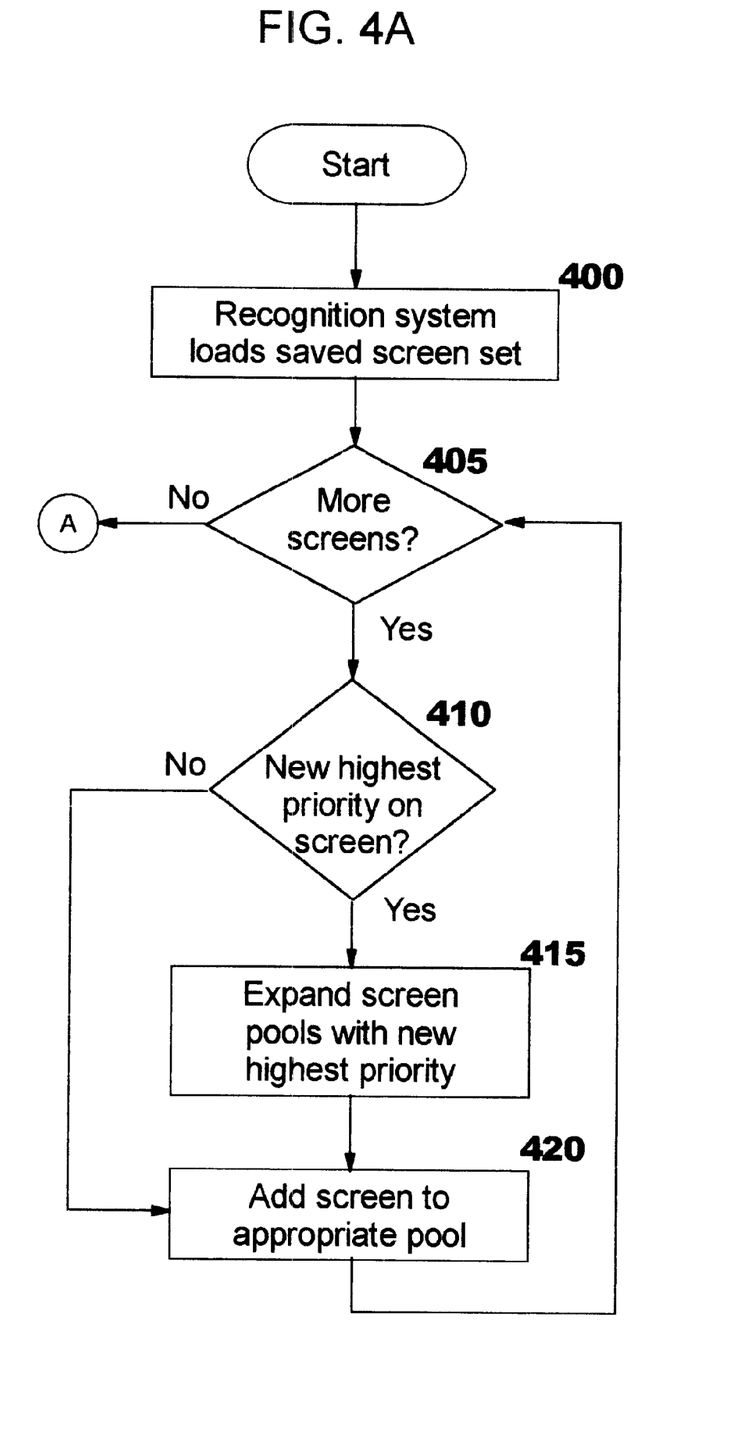
Figure 4B:
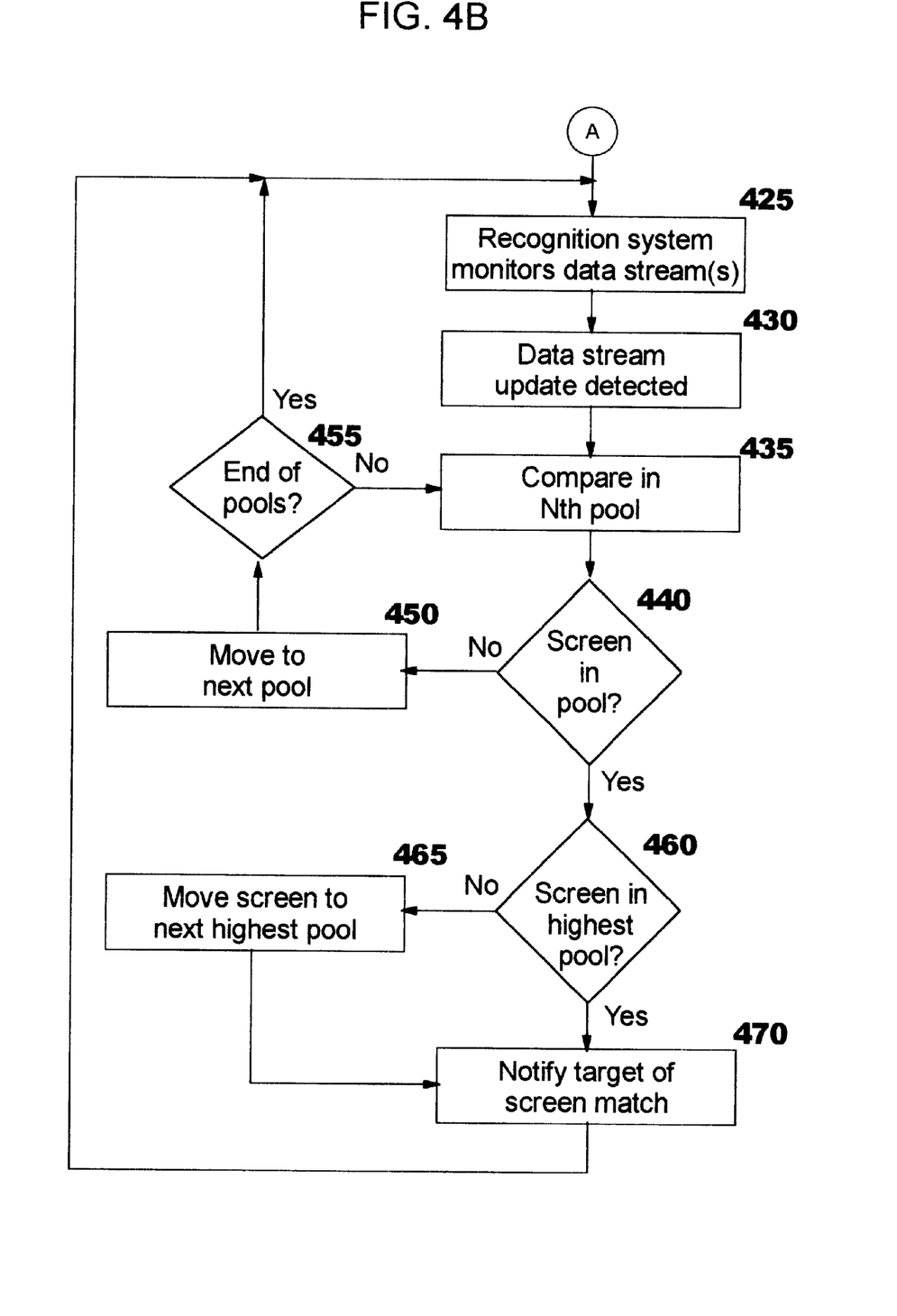

The manner in which this second aspect may be implemented for optimizing the recognition process will now be described with reference to the logic depicted in FIGS. 4A and 4B. The pool membership is first determined upon beginning operation of an embodiment of the present invention (Blocks 400–420 of FIG. 4A), and then the monitoring process uses these pools (Blocks 425–470 of FIG. 4B). At Block 400, the set of saved definitions is obtained from memory or storage. Block 405 tests to see whether there are more definitions to be processed. When the initialization process is complete, this test has a negative result and control transfers to Block 425. Otherwise, Block 410 checks whether the priority attribute value on this definition is higher than the previously determined highest priority (for the case where the highest priority attribute value indicates the number of pools to be used). If so, then Block 415 adjusts the number of pools to reflect this attribute value. After operation of Block 415, and when the test in Block 410 has a negative result, Block 420 adds the presentation space definition to the appropriate pool. The priority attribute value is preferably used to determine which pool the definition is to become a member of. (For example, when the number of pools created is equal to the highest defined attribute value, then for a definition having the attribute value of 5, the definition is added to pool number 5. When the number of pools uses an alternative algorithm, then that algorithm must be reflected in this pool assignment process.) As described with reference to the first aspect, adding a definition to a pool preferably comprises adding a definition identifier to a list or other data structure which is used to identify the definitions in each pool. Control then returns to Block 405 to continue the pool initialization process.

As stated above, the test in Block 410 is used for the case described above where the number of pools is determined by the highest defined priority attribute value. It will be obvious to one of skill in the art how the logic used for an alternative approach may be substituted in FIG. 4.

When the pool initialization process is complete, Block 425 begins monitoring the data stream(s) for arrival of presentation space data. When an update is detected (Block 430), then the arriving data is compared (Block 435) to a presentation space definition in the currently-evaluated pool. Block 440 asks whether a definition matching the arriving data was a member of the current pool. If not, Block 450 determines the next pool to be checked. The test in Block 455 has a positive result when there are no more pools to check. In this case, there is no registered target software routine for processing the data which arrived, and control therefore returns to Block 425 to continue monitoring the data stream(s) without performing any processing of the presentation space data. When Block 455 has a negative result (i.e. there are more pools that can be checked), control transfers to Block 435 to compare the arriving data to the definitions in this now-current pool. In a preferred embodiment, the pool having priority value 1 is used as the first-evaluated pool, and each successive pool number 2, 3, 4, etc. is then used until a match is detected or until there are no more pools.

Control reaches Block 460 when a match is found between the presentation space data which arrived and a definition in the current pool. Block 460 asks whether the definition is a member of the highest priority pool. If it is not, then Block 465 moves it to the next-highest priority pool. In this manner, the definitions which correspond to data which arrives during run-time are dynamically promoted to higher priority, and thus will be checked sooner on subsequent iterations through the logic of FIG. 4B. The priority attribute value associated with the definition may optionally be incremented at this point as well, causing the dynamically learned priority to persist from one run-time invocation of the present invention to another. After operation of Block 465, or when Block 460 has a positive result, Block 470 generates an asynchronous notification of the presentation space arrival to the corresponding target software routine. (The processing by the target does not form part of the present invention, as previously stated.) Control then returns to Block 425 to await arrival of the next presentation space.

In a third aspect of the present invention, which may optionally be used in conjunction with the second aspect, presentation space definitions may be demoted from one priority pool to a lower priority pool if the definition does not match an arriving presentation space within a particular inactivity time period. In this aspect, each time a definition matches incoming presentation space data, a last-arrival timestamp is updated to reflect when the detection occurred. This may be implemented by inserting an additional operation between Blocks 440 and 460 of FIG. 4, where the last-arrival timestamp may be stored (for example) as an additional attribute of each presentation space definition or as an additional information element (along with each definition identifier) of the list maintained for pool membership.

Figure 5:
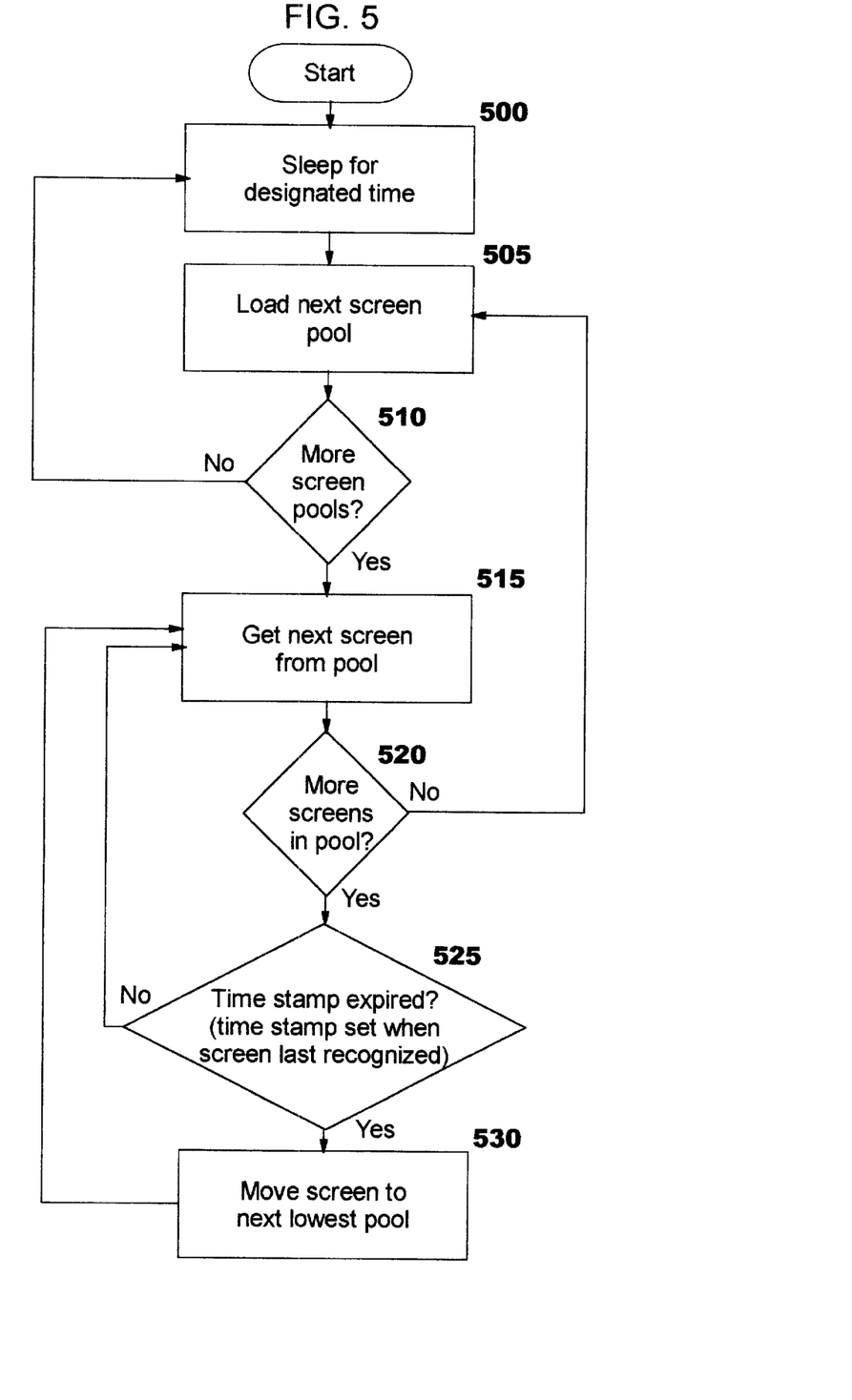

The logic with which this demotion process may be implemented is depicted in FIG. 5. Preferably, an implementation of this logic runs as a separate thread or process from the recognition logic of the present invention, for example as a daemon which is invoked periodically according to a sleep timer. This sleep timer may be set to a configured value, or may use a value coded directly into the demotion software. Block 500 indicates that the demotion process sleeps for the designated time, and upon awakening, the logic of Blocks 505–530 is iteratively performed to demote those definitions (if any) which have been inactive beyond a prescribed time period.

At Block 505, a pool of definitions is made available for processing. Block 510 tests whether there are more pools to be processed. If not, control returns to Block 500, such that the demotion process is again suspended for the appropriate sleep time. When Block 510 has a positive result, however, Blocks 515–530 iteratively process each definition in the currently-evaluated pool. Block 515 obtains a definition obtains a definition from this pool, and Block 520 test whether there are more definitions in this pool (i.e. whether or not the pool definitions are at an end). When the test at Block 520 has a negative result, then there are no more definitions in the current pool, and control returns to Block 505 to process another pool. Otherwise, processing of the obtained definition continues at Block 525, which compares the last-arrival timestamp for this definition to an inactivity time period. If the inactivity time period has expired, then this presentation space definition has not been matched recently enough, and it will be demoted to a lower priority pool (Block 530). This preferably comprises moving its identifier to the list which identifies the pool members of the next-lower priority pool. After operation of Block 530, or when the definition is not to be demoted because the inactivity timer has not been exceeded (i.e. a negative result at Block 525), control returns to Block 515 to evaluate another definition in the current pool.

The particular value used for the inactivity timer may be configured as a common application-wide value, or may be coded into the demotion logic. Alternatively, different inactivity values may be used for each presentation space definition by (for example) defining the inactivity time period as an additional attribute of the corresponding definition.

In a fourth aspect of the present invention, presentation space definitions and their attributes (including the associated target software routine for each definition as well as dynamically observed information for priority, last-arrival timestamp, etc., as appropriate for a particular aspect of the present invention) may be persisted to a data store. As one example of a persistence technique, the definitions and associated attributes may be stored to a database or file using a markup language such as the Extensible Markup Language. When dynamically observed attribute information is persisted, the system optimization achieved through use of this aspect of the present invention extends beyond a single run-time, enabling the dynamically observed information to reflect an arbitrarily long history period.

Figure 6:
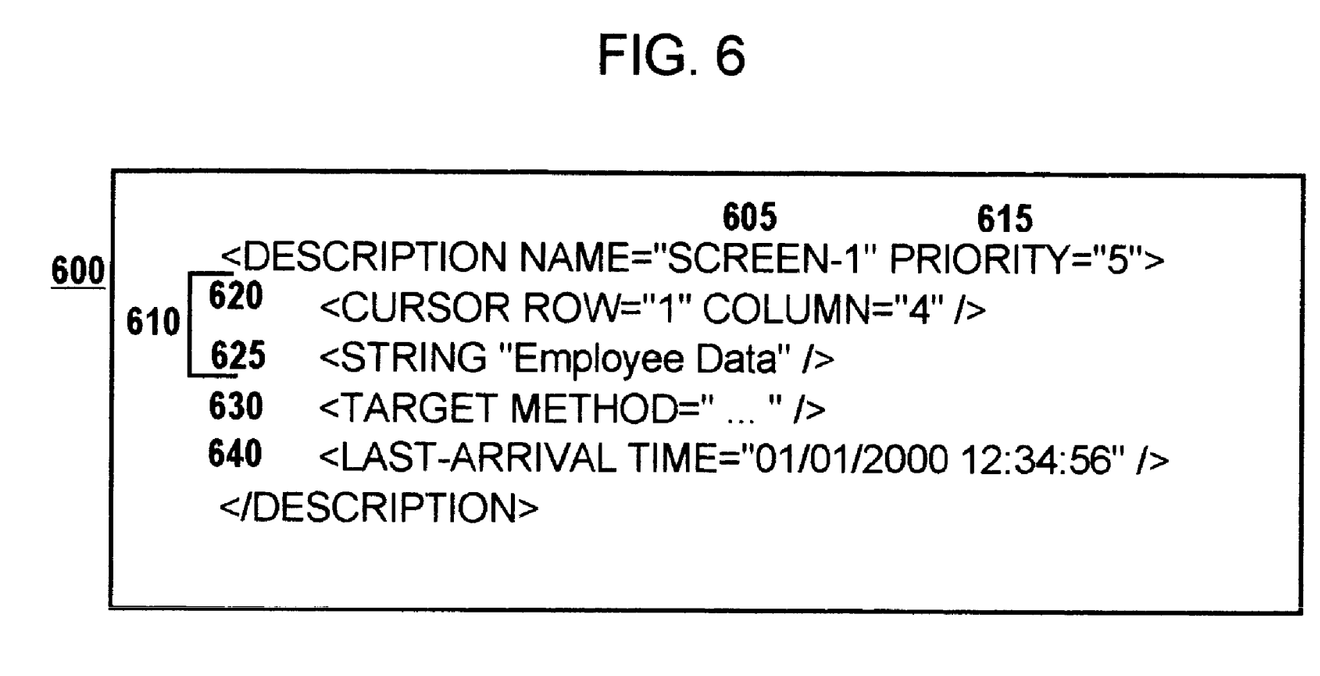
FIG. 6 illustrates an example of markup tags that may be used for persisting a presentation space definition according to the present invention.

FIG. 6 illustrates an example of the markup tags that may be used for persisting a presentation space definition according to this fourth aspect. As will be obvious, the tag syntax used in FIG. 6 is merely one example, and a different syntax may be used if desired. Each persisted definition 600 preferably comprises an identifier 605, and the presentation space definition details 610. An arbitrary number of elements 620, 625 may comprise a particular definition. In this example, the definition indicates that a match occurs if the cursor is positioned at row 1, column 4 (see element 620) and the data contains the string "Employee Data" (element 625). Further, the target software routine is identified using application-specific naming conventions (element 630). When priority pools are used, according to the second aspect described above, a priority attribute value 615 is included. When the demotion process described above for the third aspect is implemented, the persisted definition 600 also comprises a last-arrival timestamp 640.

Other techniques for dynamically learning the prioritization for a particular presentation space definition may be used as well, such as counting the frequency of arrival of the presentation space (with a more frequently arriving presentation space having a higher priority than a less frequently arriving presentation space). Preferably, a counter is associated with each stored presentation space definition, and this counter is incremented each time the presentation space is detected in the incoming data stream. This counter is then used as the priority value for the definitions during the comparison process at run-time. Depending on the needs of a particular implementation of the present invention, the counter values may be periodically reset (including resetting the values each time the present invention is used with an application). This may be useful when operating conditions change, such that the reset counters reflect presentation space arrival for a currently-applicable operational environment. Or, it may be desirable to initialize the values only once (upon the first use of the present invention), such that each counter reflects an on-going history of presentation space arrival. It will be obvious to one of ordinary skill in the art how the logic of FIGS. 4A and 4B may be changed to implement this counting approach to prioritization (e.g. where the definitions are compared according to decreasing order of counter value, rather than according to a pool membership order, and where the counter is incremented upon detecting a match rather than promoting definitions to higher-priority pools upon a match).

As has been described, the present invention provides an improved technique for recognition of presentation space data. The various aspects which have been described are particularly advantageous when a large number of presentation space definitions exist.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product for optimizing recognition of presentation space data generated by a legacy host application, said computer program product embodied on a computer-readable medium and comprising:

computer-readable program code means for organizing a plurality of presentation space definitions into a plurality of pools, such that each of said pools logically contains zero or more of said presentation space definitions, and wherein prioritized order is established among said plurality of pools;

computer-readable program code means for monitoring at least one data stream for arrival of presentation space data, to detect arrival of a presentation space;

computer-readable program code means for comparing said arrived presentation space to each of said plurality of presentation space definitions in each successive one of said plurality of pools, according to said prioritized order among said pools, until detecting a match or determining that no match is possible; and computer-readable program code means for notifying a target software routine to process said arrived presentation space upon detecting a said match by said computer-readable program code means for comparing.

2. The computer program product according to claim 1, wherein:

each of said pools corresponds to a particular time of day period;

said plurality of presentation space definitions logically contained in each pool are those presentation space definitions corresponding to presentation spaces that are expected to arrive during said particular time of day period to which said pool corresponds; and said computer-readable program code means for comparing further comprises:

computer-readable program code means for determining a current time of day at which said computer-readable program code means for comparing is performed; and computer-readable program code means for selecting, as a first one of said plurality of pools in said prioritized order, that one of said plurality of pools having said particular time of day period that corresponds to said determined current time of day.

3. The computer program product according to claim 2, wherein said computer-readable program code means for comparing further comprises:

computer-readable program code means for selecting, upon failing to detect said match using said first one of said plurality of pools, each successive one of said plurality of pools after said first one, by alternating between selecting said successive one having a next-earlier and a next-later one of said particular time of day periods, with reference to said current time of day; and computer-readable program code means for adding to said first one of said plurality of pools, upon detecting said match using one of said selected ones, said compared-to presentation space definition.

4. The computer program product according to claim 3, further comprising computer-readable program code means for persisting said logical organization of presentation space definitions into said plurality of pools to persistent storage, thereby reflecting operation of said computer-readable program code means for organizing and said computer-readable program code means for adding.

5. The computer program product according to claim 1, wherein each of said pools has a corresponding priority attribute value that is used to identify said prioritized order; and wherein said computer-readable program code means for comparing further comprises:

computer-readable program code means for selecting, as a first one of said plurality of pools in said prioritized order, that one of said plurality of pools having a highest of said priority attribute values; and computer-readable program code means for selecting, upon failing to detect said match using said first one of said plurality of pools, each successive one of said plurality of pools after said first one, as that one of said plurality of pools having a next-highest of said priority attribute values.

6. The computer program product according to claim 5, further comprising:

computer-readable program code means for promoting, upon detecting said match using one of said selected ones, said compared-to presentation space definition such that it is then logically contained in that one of said pools having a next-higher one of said priority attribute values.

7. The computer program product according to claim 6, further comprising computer-readable program code means for persisting said logical organization of presentation space definitions into said plurality of pools to persistent storage, thereby reflecting operation of said computer-readable program code means for organizing and said computer-readable program code means for promoting.

8. The computer program product according to claim 6, further comprising computer-readable program code means for selectively demoting presentation space definitions, further comprising:

computer-readable program code means for defining an inactivity timer;

computer-readable program code means for remembering a timestamp when each of said plurality of presentation space definitions was last matched during operation of said computer-readable program code means for comparing;

computer-readable program code means for comparing each of said remembered time stamps to said inactivity timer; and computer-readable program code means for moving each of said presentation space definitions for which said computer-readable program code means for comparing said remembered timestamp determines that said inactivity timer has expired, wherein said definition is moved from a first pool to a second pool having a next-lower of said priority attribute values than said first pool.

9. The computer program product according to claim 8, further comprising computer-readable program code means for persisting said logical organization of presentation space definitions into said plurality of pools to persistent storage, thereby reflecting operation of said computer-readable program code means for organizing, said computer-readable program code means for promoting, and said computer-readable program code means for selectively demoting.

10. A system for optimizing recognition of presentation space data generated by a legacy host application in a computing environment, comprising:

means for organizing a plurality of presentation space definitions into a plurality of pools, such that each of said logically contains zero or more of said presentation space definitions, and wherein a prioritized order is established among said plurality of pools;

means for monitoring at least one data stream for arrival of presentation space data, to detect arrival of a presentation space;

means for comparing said arrived presentation space to said plurality of presentation space definitions in each successive one of said plurality of pools, according to said prioritized order among said pools, until detecting a match or determining that no match is possible; and means for notifying a target software routine to process said arrived presentation space upon detecting a said match by said means for comparing.

11. The system according to claim 10, wherein:

each of said pools corresponds to a particular time of day period;

said plurality of presentation space definitions logically contained in each pool are those presentation space definitions corresponding to presentation spaces that are expected to arrive during said particular time of day period to which said pool corresponds; and said means for comparing further comprises:

means for determining a current time of day at which said means for comparing is performed; and means for selecting, as a first one of said plurality of pools in said prioritized order, that one of said plurality of pools having said particular time of day period that corresponds to said determined current time of day.

12. The system according to claim 11, wherein said means for comparing further comprises:

means for selecting, upon failing to detect said match using said first one of said plurality of pools, each successive one of said plurality of pools after said first one, by alternating between selecting said successive one having a next-earlier and a next-later one of said particular time of day periods, with reference to said current time of day; and means for adding to said first one of said plurality of pools, upon detecting said match using one of said selected ones, said compared-to presentation space definition.

13. The system according to claim 12, further comprising means for persisting said logical organization of said presentation space definitions into said plurality of pools to persistent storage, thereby reflecting operation of said means for organizing and said means for adding.

14. The system to claim 10, wherein each of said pools has a corresponding priority attribute value that is used to identify said prioritized order; and wherein said means for comparing further comprises:

means for selecting, as a first one of said plurality of pools in said prioritized order, that one of said plurality of pools having a highest of said priority attribute values;

means for selecting, upon failing to detect said match using said first one of said plurality of pools, each successive one of said plurality of pools after said first one, as that one of said plurality of pools having a next-highest of said priority attribute values.

15. The system according to claim 14, further comprising:

means for promoting, upon detecting said match using one of said selected ones, said compared-to presentation space definition such that it is then logically contained in that one of said pools having a next-higher one of said priority attribute values.

16. The system according to claim 15, further comprising means for persisting said logical organization of said presentation space definitions into said plurality of pools to persistent storage, thereby reflecting operation of said means for organizing and said means for promoting.

17. The system according to claim 15, further comprising means for selectively demoting presentation space definitions, further comprising:

means for defining an inactivity timer;

means for remembering a timestamp when each of said plurality of presentation space definitions was last matched during operation of said means for comparing;

means for comparing each of said remembered time stamps to said inactivity timer; and means for moving each of said presentation space definitions for which said means for comparing said remembered timestamp determines that said inactivity timer has expired, wherein said definition is moved from a first pool to a second pool having a next-lower of said priority attribute values than said first pool.

18. The system according to claim 17, further comprising means for persisting said logical organization of said presentation space definitions into said plurality of pools to persistent storage, thereby reflecting operation of said means for organizing, said means for promoting, and said means for selectively demoting.

19. A method for optimizing recognition of presentation space data generated by a legacy host application in a computing environment, comprising the steps of:

organizing a plurality of presentation space definitions into a plurality of pools, such that each of said pools logically contains zero or more of said presentation space definitions, and wherein a prioritized order is established among said plurality of pools;

monitoring at least one data stream for arrival of presentation space data, to detect arrival of a presentation space;

comparing said arrived presentation space to said plurality of presentation space definitions in each successive one of said plurality of pools, according to said prioritized order among said pools, until detecting a match or determining that no match is possible; and notifying a target software routine to process said arrived presentation space upon detecting a said match by said comparing step.

20. the method to claim 19, and wherein:

each of said pools corresponds to a particular time of day period;

said plurality of presentation space definitions logically contained in each pool are those presentation space definitions corresponding to presentation spaces that are expected to arrive during said particular time of day period to which said pool corresponds; and said comparing step further comprises the steps of:
  determining a current time of day at which said means for comparing is performed; and
  selecting, as a first one of said plurality of pools in said prioritized order, that one of said plurality of pools having said particular time of day period that corresponds to said determined current time of day.

21. The method according to claim 20, wherein said comparing step further comprises the steps of:

selecting, upon failing to detect said match using said first one of said plurality pools, each successive one of said plurality of pools after said first one, by alternating between selecting said successive one having a next-earlier and a next-later one of said particular time of day periods, with reference to said current time of day; and adding to said first one of said plurality of pools, upon detecting said match using one of said selected ones, said compared-to presentation space definition.

22. The method according to claim 21, further comprising the step of persisting said logical organization of said presentation space definitions into said plurality of pools to persistent storage, thereby reflecting operation of said organizing step and said adding step.

23. The method according to claim 19, wherein each of said pools has a corresponding priority attribute value that is used to identify said prioritized order; and wherein said comparing step further comprises the steps of:

selecting, as a first one of said plurality of pools in said prioritized order, that one of said plurality of pools having a highest of said priority attribute values;

selecting, upon failing to detect said match using said first one of said plurality of pools, each successive one of said plurality of pools after said first one, as that one of said plurality of pools having a next-highest of said priority attribute values.

24. The method according to claim 23, further comprising the step of:

promoting, upon detecting said match using one of said selected ones, said compared-to a presentation space definition such that it is then logically contained in that one of said pools having a next-higher one of said priority attribute values.

25. The method according to claim 24, further comprising the step of persisting said logical organization of said presentation space definitions into said plurality of pools to persistent storage, thereby reflecting operation of said organizing step and said promoting step.

26. The method according to claim 23 or claim 24, further comprising the step of selectively demoting presentation space definitions, further comprising the steps of:

defining an inactivity timer;

remembering a timestamp when each of said plurality of presentation space definitions was last matched during operation of said comparing step;

comparing each of said remembered time stamps to said inactivity timer; and moving each of said presentation space definitions for which said step of comparing said remembered timestamp determines that said inactivity timer has expired, wherein said definition is moved from a first pool to a second pool having a next-lower of said priority attribute values than said first pool.

27. The method according to claim 26, further comprising the step of persisting said logical organization of said presentation space definitions into said plurality of pools to persistent storage, thereby reflect operation of said organizing step, said promoting step, and said selectively demoting step.

28. A method of optimizing recognition of presentation space data generated by a legacy host application, the method comprising steps of:

associating a frequency counter with each of a plurality of presentation space definitions, each of the frequency counters having a value that counts a number of times the associated presentation space definition has matched a presentation space arriving in a data stream;

comparing each arriving presentation space that is detected in the data stream to the presentation space definitions, starting from the presentation space definition having a highest-valued frequency counter and successively proceeding to the presentation space definition having each next-highest-valued frequency counter, until detecting a match or determining that no match is possible; and upon detecting the match, incrementing the value of the frequency counter for the compared-to presentation space definition and notifying a target software routine to process the arriving presentation space.

* * * * *